United States Patent

Stroll, Jr.

[11] Patent Number: 5,274,501
[45] Date of Patent: * Dec. 28, 1993

[54] GLARE AND EYE STRAIN PREVENTION APPARATUS

[76] Inventor: John J. Stroll, Jr., 980 Post Road East, Ste. 3, Westport, Conn. 06880

[*] Notice: The portion of the term of this patent subsequent to Mar. 10, 2009 has been disclaimed.

[21] Appl. No.: 848,239

[22] Filed: Mar. 9, 1992

Related U.S. Application Data

[63] Continuation-in-part of Ser. No. 489,352, Jul. 13, 1990, Pat. No. 5,095,385.

[51] Int. Cl.⁵ ............................................. G02B 27/00
[52] U.S. Cl. .................................... 359/613; 359/609; 358/252
[58] Field of Search ............... 359/601, 602, 603, 604, 359/609, 610, 613, 808, 612, 817, 894; 358/250, 252, 255

[56] References Cited

U.S. PATENT DOCUMENTS

| | | | |
|---|---|---|---|
| 3,553,866 | 1/1971 | Redford et al. | 359/817 |
| 4,314,280 | 2/1982 | Rose | 359/612 |
| 4,569,572 | 2/1986 | Kopich | 359/601 |
| 4,668,026 | 5/1987 | Lapeyre et al. | 359/609 |
| 4,784,468 | 11/1988 | Tierney | 359/601 |
| 4,863,242 | 9/1989 | Correa | 359/601 |
| 4,880,300 | 11/1989 | Payner et al. | 359/601 |
| 5,069,529 | 12/1991 | Takahashi | 359/601 |
| 5,095,385 | 3/1992 | Stroll, Jr. | 359/609 |

*Primary Examiner*—Loha Ben
*Attorney, Agent, or Firm*—Morgan & Finnegan

[57] ABSTRACT

A glare reduction system for viewing an object comprising a top, a bottom and two side projection panels wherein the panels are interconnected so as to form an enclosure. The system can also include at least one shutter panel which is mounted at or near an outward edge of at least one of the projection panels and which is adjustable to control reflective light. At least one bulletin board panel can also be affixed to the side or top projection panel. Additionally, eye strain reduction can be obtained by the use of a system of moveable lenses that is manually adjustable or is provided with a mechanism to move the lenses in and out of an enclosure portion and in front of or away from the object being viewed.

26 Claims, 3 Drawing Sheets

GLARE AND EYE STRAIN PREVENTION APPARATUS

This application is a continuation-in-part of U.S. Ser. No. 489,352, filed on Jul. 13, 1990, now U.S. Pat. No. 5,095,385.

BACKGROUND OF INVENTION

1. Field of The Invention

This invention concerns devices and systems for improving the viewing of objects such as computer terminal display monitors or television screens, automated bank teller card machines, light boxes for viewing photos, arcade games, boating equipment, x-ray reading machines and other electronic information display screens and signs, by reducing and/or preventing glare. The instant invention also relates to an improved system for reducing and/or preventing glare in video display screens which additionally include means for reducing eye strain in a viewer looking at the video display screen. Both the glare reduction system and the means for reducing eye strain can be used individually to reduce glare and/or eye strain in applications other than video display screens.

2. Description of The Prior Art

It has already been recognized that glare resulting from sunlight can present significant difficulties in viewing and operating display screens such as computer terminal display screens. The problem of reducing glare in the use of computer display terminals has been addressed by a widely varying assortment of devices, from a relatively simple visor assembly such as is disclosed in U.S. Pat. No. 4,863,242 issued to Correa on a somewhat complex reflecting system, such as those disclosed in U.S. Pat. No. 4,880,300 issued to Payner et al.

Shields or hoods are disclosed for this purpose in U.S. Pat. No. 4,569,572 issued to Kopich. A rigid shield assembly for reducing glare, which can be adjusted with respect to its position, is disclosed in U.S. Pat. No. 4,784,468 issued to Tierney. Such devices allow the shield to be moved depending upon the angle of light. Hinged swinging panels have also been used as a light shield for cathode ray tube displays, such as those disclosed in U.S. cathode ray tube displays, such as those disclosed in U.S. Pat. No. 3,564,138 issued to Harrold.

Nevertheless, glare remains a serious problem for those who spend large amounts of time viewing display screens such as computer display terminals. Glare can impede accurate vision and it can also cause eyestrain, discomfort and fatigue. While prior attempts to reduce glare in the viewing of display terminals has helped solve some of the difficulties associated with glare in certain environments and applications, there still exits a need for a simple and effective system for substantially reducing and/or preventing glare in the viewing of display terminals which has wide application. A particular need remains for a system to reduce or eliminate glare caused by reflection below the screen.

Glare reduction is also desirable in other environments, such as, for example, when reading documents in highly sunlit or artificially lit areas with excessive glare.

Eye strain can also result from the viewing of a particular area for extended periods of time. The eyes remain focussed at one distance causing possible cramping of the muscles of the eye. A particular need remains for a means to reduce this type of eyestrain.

It is an object of the present invention to not only reduce and/or prevent glare from overhead light but to reduce glare from all angles.

It is a further object of the present invention to increase the security of a video display by limiting visual access to the video screen.

It is a still further object of the present invention to provide panels which form a part of the glare reducing and/or preventing device, and which can be used to mount various objects.

It is a still further object of the present invention to provide means for the reduction of eye strain due to the prolonged viewing of a particular area at a relatively constant distance.

SUMMARY OF THE INVENTION

The present invention is a glare reduction and/or prevention system for viewing of objects such as video display monitors or signs, such as computer terminal displays or for use in reading documents in highly lit and environments full of glare. The system generally comprises four panels, a top, bottom and two side panels. This system can be mounted on or attached to a video display monitor or sign so that the panels project from each of the four sides of the video display monitor or sign (projection panels) or from the front of the monitor. The panels reduce the amount of light falling onto the screen from any direction. Additionally, this panel assembly can be placed around a document which is sought to be read in a highly lit environment. Since the panels reduce the amount of light falling on the document, glare and reflective light off the document are reduced and the document is more easily read. Shutter panels can also be attached to at least one of the panels and can be selectively positioned to control reflective light.

The projection panels may fold inwardly so that they are collapsible. A further embodiment includes optional bulletin board panels which can be attached to one or more of the sides and/or top projection panel.

In one embodiment for use in a video display system the present glare guard has 9 panels and the glare guard can be fitted over or attached to a video display such as a computer terminal, personal computer, or laptop computer or sign. One panel attaches to or fits over the top of the terminal and projects straight out toward the computer operator. It blocks light from above and looks just like a canopy. A second panel attaches to or fits under the bottom of the terminal and projects straight out toward the computer operator and acts like a shelf at the bottom of the terminal. It blocks light that is reflected off the top of the desk. The third and fourth panels are attached to or fit over the left and right sides of the terminal. They prevent light from falling onto the screen from each side. These four panels can also attach to the front face of the video display and project outwardly and form an enclosure around the terminal so that light can not fall onto the screen from above, below or from the side. Optional fifth and sixth panels can be attached to the enclosure portion and form adjustable shutters that let the operator peek in at the video display. The opening to the video display defined by the shutters can be adjusted according to how much of the screen one wishes to have visible. The seventh, eighth and ninth panels form small walls that can act as a bulletin board. They can be opened towards or away from the operator by any suitable hinge or hinge-like means or can be removed and may be tiltable. The seventh and eight panels can be attached to the left and right side of the terminal just like ears attach to a face. The ninth panel can be attached perpendicular to the top projection panel. The bottom edge of the seventh and eighth panels may have a shelf which can be curved. The shelf can be made any desirable size and, e.g., can be 2" wide and 10" long so that pens and pencils and other objects can be stored thereon. A line bar guide can be attached in any suitable manner to any of the bulletin board panels. The line bar guide is so attached so that it may be adjusted upwardly or downwardly or left to right along the bulletin board. Normally, the line bar guide will extend across all or a portion of the bulletin board. Additionally, the line bar guide can be made to be extendable by folding, for example, to extend beyond the edge of the bulletin board so as to accommodate larger materials.

All panels of the present glare guard can be made to be adjustable in length, height, or width so that they can fit around or attach to any size object sought to be viewed. This is especially important for the enclosure portion. Even the bulletin portion panels can be pre-cut so that one can break off small sections of each panel until the idea size to fit the terminal is obtained.

The enclosure portion panels can be made to fold inwardly or can be collapsible to facilitate for their use with laptop computers. This will permit the operator to close the laptop computer's cover even with the present glare guard system still attached.

The present glare reduction assembly with or without shutters can be used to reduce glare when viewing various objects or documents in highly lit areas. Hence, if the glare reduction system is attached to a video display monitor, it can be detached and attached to a suitable holding means, such as a stand, for viewing objects, such as written or printed material.

An eye strain reduction means can be used with the present glare reduction means or by itself. The eye strain reduction means generally comprises a system in which lens can slide in front of or toward or away from the screen of the computer terminal or some other object which is being viewed. These lenses will magnify the characters on the screen or on the viewed object or the viewed object itself. The lens can optionally be coated with a film that reduces electro-magnetic radiation.

Each lens can cover the entire screen of the terminal or the entire or a portion of the object being viewed and can slide in front of or toward or away from the screen or the object being observed automatically via a motor means. The length of time that each lens remains in the operator's field of view can be adjusted by the operator by appropriate adjustment of the motor means. These lenses will vary the operator's focal point so that his/her eye muscles will not cramp. This should prevent the blurred vision that often results. By constantly adjusting the focal point, the eyes will no longer be forced to stay focused in one position for a long period of time. This should be equivalent to looking around a room in a normal and relaxed fashion.

A frame can hold many lenses and can be a simple box that can be adapted to attach between the shutters of the instant glare reduction system and the area viewed. One half of the box will be hollow so that the lenses can slide in front of the operator's field of view. The operator looks through the lens into the viewed area. The other half of the box is closed on all sides except the side where lenses slide in and out. This is where the remaining lenses are stored when not in use. First, when being installed, this box can be rotated so that a person can have the closed half, where the lenses are stored, be positioned to the right, left, or even, above or below a terminal. It is preferred to have the lenses stored above the terminal because there is usually very little free space below the terminal. If the lenses are stored to the right or the left, then the bulletin board panels may not be able to be used.

The present glare prevention system including the side, bottom and top panels as well as the box including the lenses but without bulletin board panels and with or without shutter panels can be used separately as a viewing means to look at documents or other objects. For example, such a system could be provided with a stand and used to enable a person to read books or other materials in a glare reduced environment. Similarly, such a system could be used for glare reduced reading of medical and dental x-rays if the instant glare reducing and prevention system is placed around the x-ray reading system.

The present system includes an eye strain reducing means. A person reading a book, for example, has the book at a fixed focal point. The present eye strain reducing means includes lenses which vary the focal point and relax the eye muscles that could eventually cramp and cause blurred vision. The effect would be the same as if the book was moving around the room. The reader would be adjusting his/her eyes just as if he/she were normally looking around the room. The lenses can also provide magnification for difficult-to-read objects or to provide enhanced viewing and provide detailed viewing of specific areas as needed.

The glare prevention and/or reduction system of the present invention including the sides, top and bottom panels, with or without shutter panels can be mounted onto the side bulletin panels of the present glare prevention and/or reduction system. Such a glare prevention and/or reduction system for the bulletin board panels can be constructed such that the panels of the system project outwardly from the bulletin board panel around the perimeter of the bulletin board. Such a system creates an environment where the light level and glare can be controlled. In this manner, eye muscle fatigue due to changes in contrast can be minimized.

Additionally, a light can be installed in the bulletin board enclosure system. The light can be installed on the top or bottom or one of the side panels of the bulletin board panel enclosure system.

Various further modifications can be made to the bulletin board panels to provide useful conveniences for the user. These include, for example, a line bar guide and spring clips or VELCRO-type fasteners for holding material on the bulletin board panel. The spring clip can be of various widths but conveniently it should be wide enough so that the corners of even an eight inch wide attachment will not keep bending over.

The features and advantages of the invention will become more apparent from the following description when taken in connection with the accompanying drawings which show, for purposes of illustration only, several embodiments in accordance with the present invention.

It should be understood by those skilled in the art of glare prevention that other forms of the present invention may be had, all coming within the spirit of the invention and scope of the appended claims.

DETAILED DESCRIPTION OF THE PREFERRED EMBODIMENT

Figure 1:
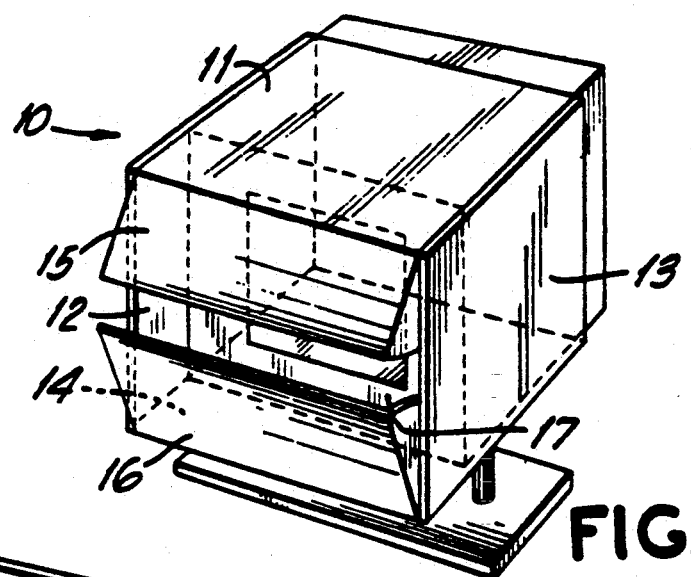
FIGS. 1 is a view of the glare guard assembly of the present invention on a video display screen.

The glare prevention and reduction system of the present invention shown mounted on a video display system is generally indicated in FIG. 1 as 10 and comprises an enclosure system of adjustable side projection panels, 12, 13, top projection panel 11, bottom projection panel 14, and, additionally, adjustable shutter panels 15, 16.

Each of the projection panels, 11, 12, 13, 14, extends outward, toward the viewer, from the display 17. Each of the projection panels fits over or attaches to the display by conventional means. Thus, the projecting panels form a cave or enclosure which circumscribes or attaches to the front of the video display screen. The cave or enclosure encompasses the entire video display and prevents reflective light from entering or leaving the video display from all sides and directions.

Shutter panels 15 and 16 can be connected at or near the distal ends of the enclosure comprised of panels 11, 12, 13, and 14. The shutter panels 15, 16 are adjustable so as to selectively cover the entire screen, or to allow viewing of selected portions of the screen.

The glare reduction system of the present invention which includes shutter panels 15, 16 further reduces glare not just from overhead light but from all sides. Even light that is reflected from below the display terminal, e.g., from a desk, may be blocked as well as light reflected off the video display screen viewer's apparel. Moreover, the shutter panels, 15, 16, provide the additional benefit of confidentiality. The shutters can also be utilized to prevent anyone but the viewer from seeing information appearing in the viewed area.

The shutter panels, 15, 16 can be made of various materials including rigid plastic or postboard or materials to reduce electro-magnetic radiation. Each panel can be adjusted for different size terminals, and can be tiltable and removable. However, they can also be made from lead to prevent magnetic radiation emission from the video display system. Alternatively, the material from which the shutters are constructed can be lined or made of a material which can block electric or magnetic fields, such as copper foil.

The projection panels, 11, 12, 13, 14 can also be made of various materials including rigid plastic as above and each panel can be adjustable for different size terminals or can be collapsible. In the same manner as the shutter panels, the projection panels can be made from lead or can be lined with an electric or magnetic field blocking material.

Figure 2:
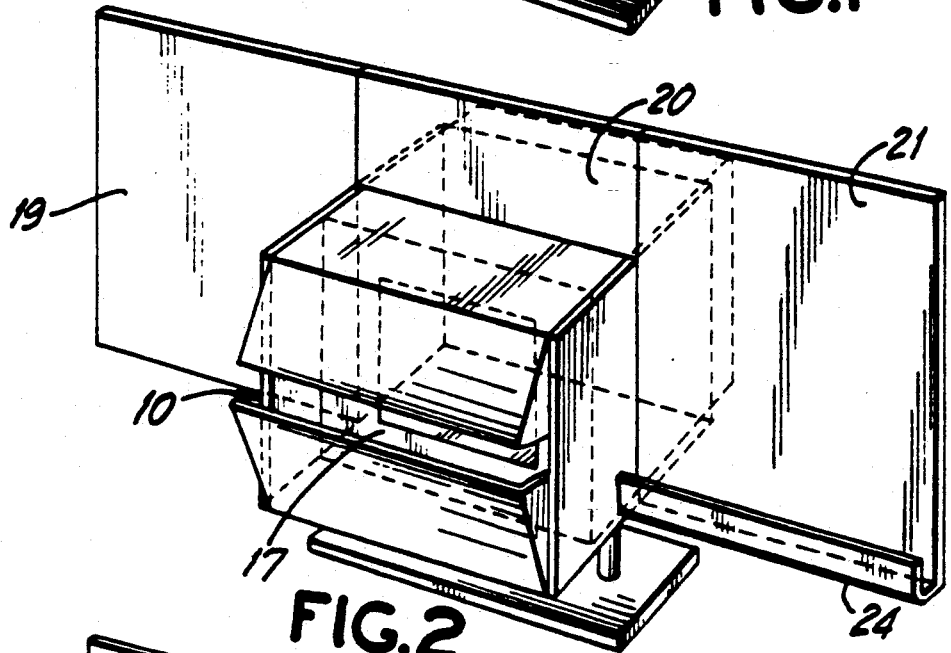
FIG. 2 is a view of the present glare guard assembly including optional panels that can be used as computer terminal bulletin boards on a video display screen.

FIG. 2 illustrates an optional embodiment of the glare-reducing system of the present invention in which additional bulletin board panels, 19, 20 and 21 are provided. The bulletin board panels, 19 and 21 are (hingeably or otherwise) connected to side projection panels, 12, 13 and are movable so that they can be opened so as to form walls on either side of the display terminal that can function as bulletin boards and to also block light. Bulletin board panel 20 is (hingeably or otherwise) connected to top projection panel 11 and can be opened upwardly to form another bulletin board or wall. Bulletin board panel 20 is also removeable, moveable and/or tiltable and functions as a bulletin board or to block light.

Preferably, all panels of the system are adjustable in length, height, and width so that they can fit around or attach to any size terminal.

Figure 3:
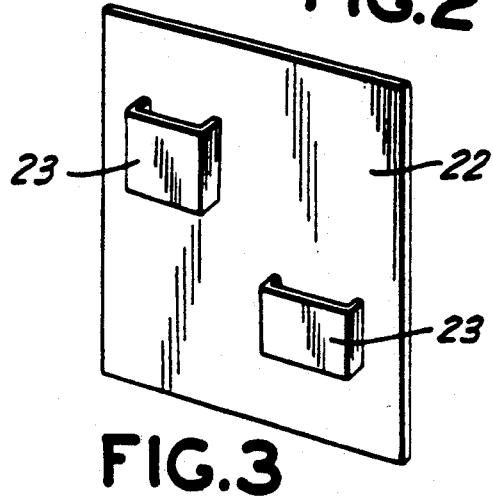
FIG. 3 is an illustration of an optional bulletin board assembly.

FIG. 3 shows an optional embodiment of one of optional area 23 shown as pockets, for holding objects. Various shapes and forms of pockets are possible including clear pockets. Instead of pockets, other means for holding and/or viewing objects, such as frames may be employed.

Adjustable shutters on the top and bottom are able to adjust the viewing opening to the video display screen and allow viewing as much of the screen as desired. The bulletin board panels can be as wide as desired and can have compartments such as picture frames into which papers or memos or other objects can be inserted and can be readily seen and/or read therethrough. The compartments on the bulletin board panels can also be in the form of pockets into which small objects such as memos, pocket calculator, an eraser or a ruler can be placed and removed when desired. The bulletin board panels 19, 21 can be attached anywhere along the side projection panels 12, 13 and panel 20 may be attached at any desired point along top panel 11.

Figure 4:
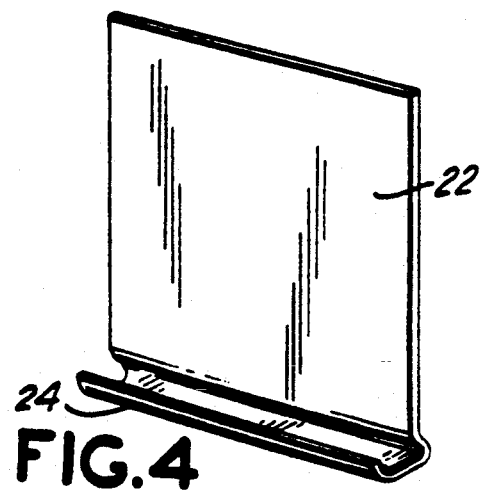
FIG. 4 is another optional bulletin board assembly.

Additionally, the left or right bulletin panels can be made with a small extension 24 as seen in FIGS. 2 and 4 at the bottom which can act as a shelf for holding various articles, such as pencils and pens or documents which are being inputted to the computer. The shelf can also be curved so that articles on the shelf will not roll off it the video terminal is tilted when the operator adjusts the terminal.

Figure 5:
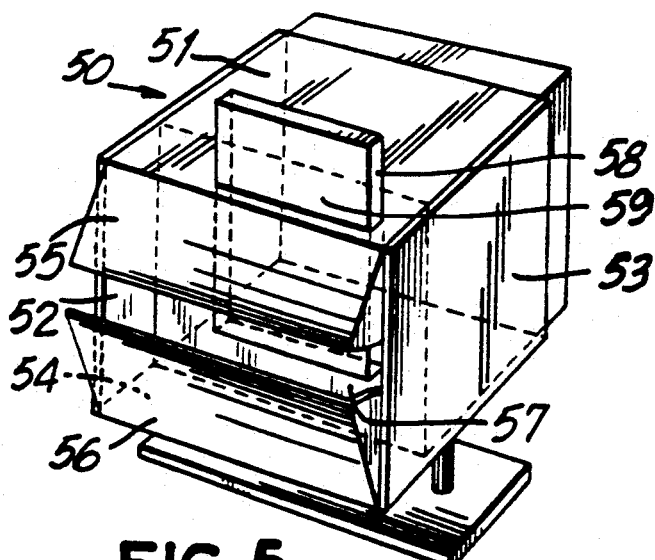
FIG. 5 is a view of the present glare reduction and/or prevention assembly including a box with lenses.

The glare prevention and/or reduction system of the present invention shown mounted on a video display system and including the instant lens system is generally indicated in FIG. 5 as 50 and comprises an enclosure system of adjustable side projection panels, 52, 53, top projection panel 51, bottom projection panel 54, and, additionally, adjustable shutter panels 55, 56.

Each of the projection panels, 51, 52, 53, 54, extends outward, toward the viewer from a side or front of the display 57. Each of the projection panels fits over or attaches to the display by conventional means. Thus, the projecting panels form a cave or enclosure which circumscribes the video display screen. A bag or just a flat rear panel can attach to the glare reduction assembly to cover rear of computer. The bag or just a flat rear panel is made of material to minimize electromagnetic radiation. The cave or enclosure can encompass the entire video display and prevents reflective light from entering or leaving the video display from all sides and directions.

Shutter panels 55 and 56 can be connected at or near the distal ends of the enclosure comprised of panels 51, 52, 53, and 54. The shutter panels 55, 56 are adjustable so as to selectively cover the entire screen, or to allow viewing of selected portions of the screen.

Inserted through the top panel 51 is a box 58 having an open section 59 containing lenses (not shown) which can be alternately moved to place them before the video display 57. This assembly comprises a system of moveable lenses. The lenses may be individually moved manually or means may be provided to automatically shift the lenses within a particular timed period. The means moves the individual lenses in and out of the closed portion of the box 58 or in front of or away from the video display 57. Additionally, means can be provided to change the distance forward or backward from the lenses to the video display or object being viewed.

Figure 6:
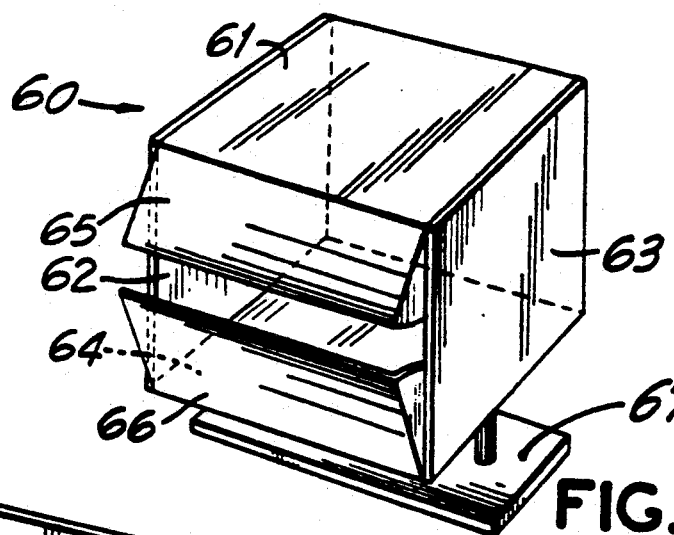
FIGS. 6 and 7 are views of a glare reduction and/or prevention assembly according to the invention.

FIG. 6 as 60 comprises an enclosure system of adjustable side projection panels, 62, 63, top projection panel 61, bottom projection panel 64, and, additionally, adjustable shutter panels 65, 66 and stand 67 which is optional and tiltable.

Each of the projection panels, 61, 62, 63, 64 extends outward, toward the viewer. Thus, the projecting panels form a cave or enclosure which could circumscribe or attach to whatever object a viewer wishes to look at or could stand freely at a distance from the object the viewer wishes to look at. The cave or enclosure could encompass the entire object being viewed and prevents reflective light from entering or leaving the area being viewed from all sides and directions.

Optional shutter panels 65 and 66 can be connected at or near the distal ends of the enclosure comprised of panels 61, 62, 63, and 64. The shutter panels 65, 66 are adjustable so as to selectively cover the viewed area, or to allow viewing of selected portions of the viewing area.

This system can optionally include a lens system 58 such as shown in FIG. 5.

Figure 7:
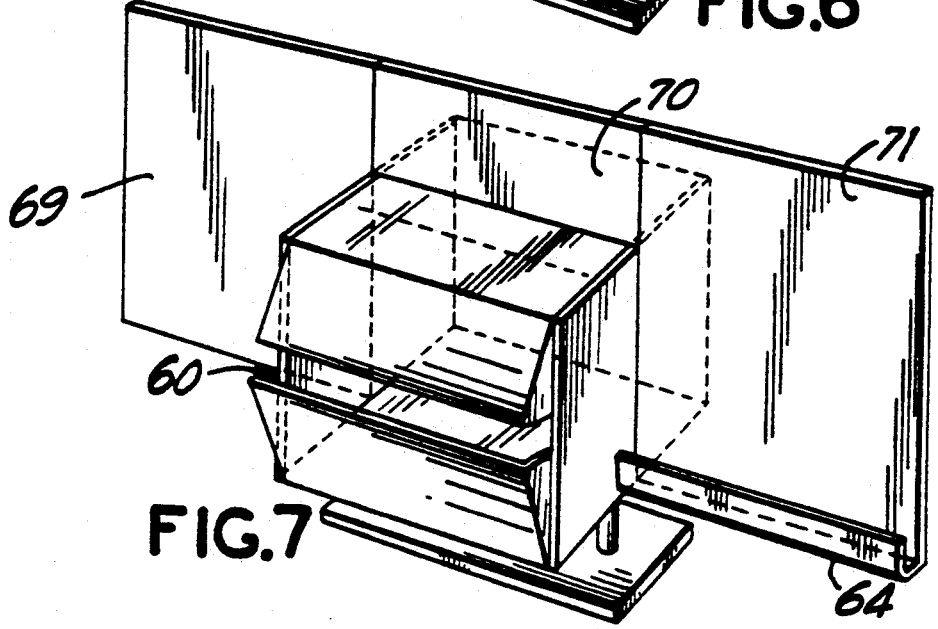

FIG. 7 shows the same basic enclosure system as 60 of FIG. 6 and further includes additional bulletin board panels 69, 70 and 71. The bulletin board panels (hingeably or otherwise) connected to the side and top panels and are moveable either in an inward or outward direction with respect to a viewer.

Figure 8:
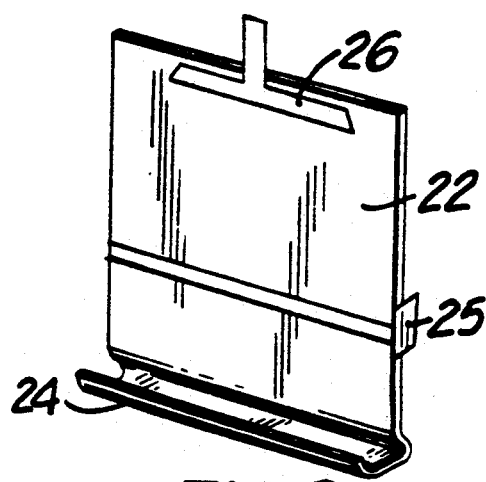
FIG. 8 is an optional bulletin board panel.

FIG. 8 shows a further optional bulletin board panel which includes the small extension 24 as well as a moveable line bar 25 and clip. 26.

Figure 9:
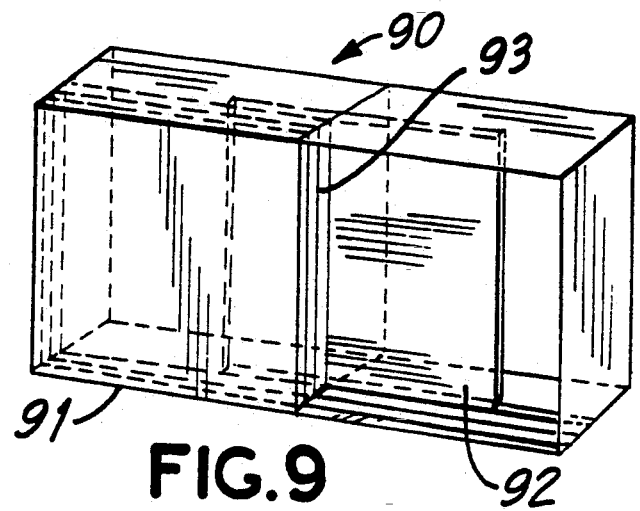
FIG. 9 shows the box containing lens for reducing eye strain.

FIG. 9 shows as 90 a box having an open portion 92 and a closed portion 91. Lenses 93 are moved between the closed and open portions either manually or by appropriate motor means (not shown).

Figure 10:
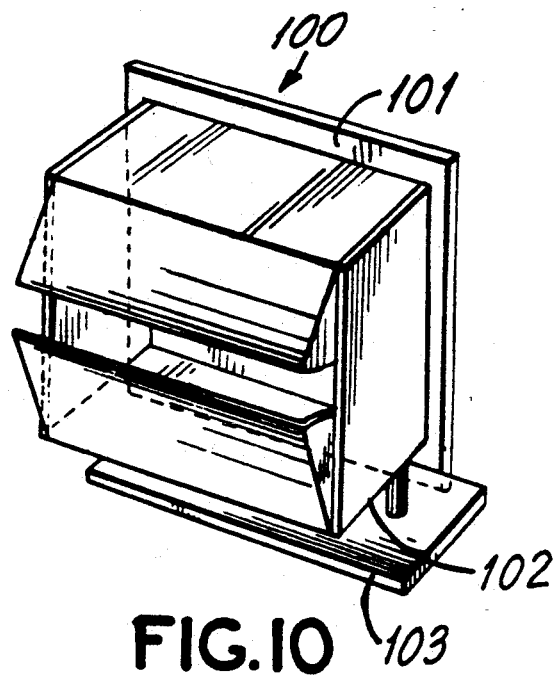
FIG. 10 shows a free-standing bulletin board with glare prevention and reduction means.

FIG. 10 shows as 100, a free-standing bulletin board 101 having a glare reduction and/or prevention system 102 with an optional stand 103. The glare reduction and/or prevention system 102 is of the same basic structure as the systems shown in FIGS. 1 and 6.

The glare guard of the present invention reduces and/or prevents glare not just from overhead light but light from all angles. Additionally, light reflected from the body of the operator can be prevented from reaching the video screen. This glare reduction and/or prevention reduces eye fatigue and, ultimately, absenteeism due to headaches that are the result of glare. The glare guard of the present invention can also increase the security of a computer video display terminal. By adjusting the shutter panels, one can prevent others from viewing the screen and, hence, prevent others from seeing, inter alia, a secret password or other confidential data.

The bulletin board panels can be tiltable, detachable and/or foldable. Notes and memos can be attached neatly to the bulletin board panels. Instead of having a messy computer room or terminal that has memos and flyers pinned or taped all over, the bulletin panels allow for better organization. Notes can be attached to the bulletin board portion of the present invention and, if the notes are confidential, then the bulletin board section can be detached, folded, and locked away. No longer does one need to remove each note. Additionally, the bulletin boards serve to block light.

The glare guard of the present invention which has a curved shelf where pens and pencils can be stored offers the benefit of finding a pen or pencil easily. When the optional bulletin board panels have many small picture frames attached in which memos can be slid into and easily viewed, time is no longer wasted searching through piles of memos. The bulletin board panels can also include a movable bar which can be used by the video display user to follow line by line any data which is being read or inputted.

The glare guard of the present invention can be constructed from various materials including plastic, lead or cardboard and can be lined with material which prevent the outflux of electrical or magnetic fields. The various panels can be painted black to further help in reducing and; or preventing glare.

The box of lenses can be used by itself by providing same with its own stand. Hence, a viewer may place the lens system on the stand before the object which is being viewed and obtained the benefit of the varying focal length provided by the lens system itself.

I claim:

1. A glare reduction system for viewing an object comprising a top, a bottom and two side projection panels said panels being interconnected so as to form an enclosure and at least one shutter panel, said shutter panel being mounted at or near an outward edge of at least one of the projection panels and being adjustable to control reflective light.

2. The glare reduction system of claim 1, having shutter panels mounted along the top and bottom projection panels.

3. The glare reduction system of claim 2, further comprising a system of moveable lenses located between the shutter panels and in front of the object being viewed.

4. The glare reduction system of claim 1, further comprising at least one bulletin board panel affixed to the side or top projection panel.

5. The glare reduction system of claim 4, further comprising a system of moveable lenses located between the shutter panel or panels and in front of the object being viewed.

6. The glare reduction system of claim 1, further comprising a system of moveable lenses located between the shutter panel and in front of the object being viewed.

7. The glare reduction assembly according to claim 6, further comprising a system of moveable lenses that is provided with means to move the lenses in and out of an enclosure portion and in front of or away from the object being viewed.

8. The glare reduction assembly according to claim 7, further comprising a side moveable panel attached to the left or right side panel which is adapted to be opened at an angle from the side panel.

9. The glare reduction assembly according to claim 7, further comprising a top moveable panel attached to the top panel and adapted to be opened at an angle from the top panel.

10. The glare reduction assembly according to claim 7, further comprising a shelf means along a bottom edge of the side moveable panel for placing or storing items.

11. The glare reduction assembly according to claim 7, having a shutter panel along both top and bottom panels.

12. The glare reduction assembly according to claim 11, further comprising a side moveable panel attached to the left or right side panel which is adapted to be opened at an angle from the side panel or a top moveable panel attached to the top panel and adapted to be opened at an angle from the top panel.

13. The glare reduction assembly according to claim 7, wherein the side or top moveable panel has means attached thereto for placing and holding objects and an enclosure portion for the side or top moveable panel comprised of a top panel, left and right depending side panels, and a bottom panel, said enclosure portion having a light and being adapted to attach to the side or top moveable panel and projects outwardly from an edge of the side or top moveable panel.

14. The glare reduction assembly according to claim 13, wherein the enclosed bulletin board panel is detachable and free standing.

15. A glare reduction assembly for viewing an object comprising an enclosure portion comprised of a top panel, left and right depending side panels and a bottom panel, said enclosure portion being adapted to fit over or attach to the object which is being viewed and at least one shutter panel attached at or near an outer edge of at least one of the panels and being adjustable to control reflective light.

16. The glare reduction assembly according to claim 15, further comprising a side moveable panel attached to the left or right side panel which is adapted to be opened at an angle from the side panel.

17. The glare reduction assembly according to claim 16, further comprising shelf means along a bottom edge of the side moveable panel for placing or storing items.

18. The glare reduction assembly according to claim 16, wherein the side moveable panel has means attached thereto for placing and holding objects.

19. The glare reduction assembly according to claim 16, where the side moveable panel has a moveable bar.

20. The glare reduction assembly according to claim 15, further comprising a top moveable panel attached to the top panel and adapted to be opened at an angle from the top panel.

21. The glare reduction assembly according to claim 15, having a shutter panel along both the top and bottom panels.

22. The glare reduction assembly according to claim 21, further comprising a side moveable panel attached to the left or right side panel which is adapted to be opened at an angle from the side panel and a top moveable panel attached to the top panel and adapted to be opened at an angle from the top panel.

23. A glare reduction assembly for viewing an object comprising an enclosure portion comprised of a top panel, left and right depending side panels, and a bottom panel, said enclosure portion being adapted to fit over or attach to the object which to be viewed and said enclosure portion further comprised a system of lenses said system of lenses having means to move the lenses in and out of the enclosure portion, or in front of or away from the object to be viewed, said glare reduction assembly optionally being attached to an optionally tiltable stand.

24. A glare reduction assembly according to claim 23, wherein said enclosure portion is further comprised of a rear panel or bag attached to the top, bottom, and left and right depending side panels to reduce electro-magnetic radiation.

25. A glare reduction assembly for viewing an object comprising an enclosure portion comprised of a top panel, left and right depending side panels, and a bottom panel, said enclosure portion being adapted to fit over or attach to the object which is being viewed, and said enclosure portion further comprised of a rear panel or bag attached to the top, bottom, and left and right depending side panels and which is made of a material which minimizes electro-magnetic radiation, said rear panel or bag covers the rear of the object which is being viewed to reduce electromagnetic radiation.

26. A glare reduction assembly for viewing an object comprising an enclosure portion comprised of a top panel, left and right depending side panels, and a bottom panel, said enclosure portion including at least one shutter panel and being adapted to fit over or attach to the object to be viewed and said enclosure portion further comprising at least one lens located in front of the object to be viewed.

* * * * *